United States Patent
Sprouts et al.

(10) Patent No.: US 7,883,577 B2
(45) Date of Patent: Feb. 8, 2011

(54) RHEOLOGY STABILIZER FOR CEMENTITIOUS COMPOSITIONS

(75) Inventors: Sandra R. Sprouts, Oakwood Village, OH (US); Frederick R. Goodwin, Solon, OH (US); Alessandro Dal Bo, Treviso (IT)

(73) Assignee: Construction Research and Technology GmbH, Trustberg (DE)

( * ) Notice: Subject to any disclaimer, the term of this patent is extended or adjusted under 35 U.S.C. 154(b) by 0 days.

(21) Appl. No.: 12/755,842

(22) Filed: Apr. 7, 2010

(65) Prior Publication Data

US 2010/0197833 A1 Aug. 5, 2010

Related U.S. Application Data

(63) Continuation of application No. 12/048,037, filed on Mar. 13, 2008, which is a continuation of application No. 10/423,386, filed on Apr. 25, 2003, now abandoned.

(51) Int. Cl.
C04B 24/04 (2006.01)

(52) U.S. Cl. .................. 106/724; 106/727; 106/728; 106/823; 524/5

(58) Field of Classification Search .......... 106/724, 106/727, 728, 823; 524/5
See application file for complete search history.

(56) References Cited

U.S. PATENT DOCUMENTS

| | | |
|---|---|---|
| 4,606,770 A | 8/1986 | Gerber |
| 5,085,708 A | 2/1992 | Morya et al. |
| 5,158,996 A | 10/1992 | Valenti |
| 5,162,402 A | 11/1992 | Ogawa et al. |
| 5,176,753 A | 1/1993 | Brook |
| 5,350,450 A | 9/1994 | Hamabe et al. |
| 5,358,566 A | 10/1994 | Tanaka et al. |
| 5,393,343 A | 2/1995 | Darwin et al. |
| 5,494,516 A | 2/1996 | Drs et al. |
| 5,583,183 A | 12/1996 | Darwin et al. |
| 5,609,681 A | 3/1997 | Drs et al. |
| 5,612,396 A | 3/1997 | Valenti et al. |
| 5,633,298 A | 5/1997 | Arfaei et al. |
| 5,643,978 A | 7/1997 | Darwin et al. |
| 5,660,626 A | 8/1997 | Ohta et al. |
| 5,661,206 A | 8/1997 | Tanaka et al. |
| 5,665,158 A | 9/1997 | Darwin et al. |
| 5,668,195 A | 9/1997 | Leikauf |
| 5,674,929 A | 10/1997 | Melbye |
| 5,703,174 A | 12/1997 | Arfaei et al. |
| 5,725,657 A | 3/1998 | Darwin et al. |
| 5,728,207 A | 3/1998 | Arfaei et al. |
| 5,753,744 A | 5/1998 | Darwin et al. |
| 5,798,425 A | 8/1998 | Albrecht et al. |
| 5,840,114 A | 11/1998 | Jeknavorian et al. |
| 5,912,284 A | 6/1999 | Hirata et al. |
| 6,008,275 A | 12/1999 | Moreau et al. |
| 6,027,561 A | 2/2000 | Gruber et al. |
| 6,063,184 A | 5/2000 | Leikauf et al. |
| 6,136,950 A | 10/2000 | Vickers, Jr. et al. |
| 6,187,841 B1 | 2/2001 | Tanaka et al. |
| 6,211,317 B1 | 4/2001 | Albrecht et al. |
| 6,267,814 B1 | 7/2001 | Bury et al. |
| 6,284,867 B1 | 9/2001 | Vickers, Jr. et al. |
| 6,290,770 B1 | 9/2001 | Moreau et al. |
| 6,310,143 B1 | 10/2001 | Vickers, Jr. et al. |
| 6,352,952 B1 | 3/2002 | Jardine et al. |
| 6,797,370 B1 | 9/2004 | Bechtoldt et al. |

FOREIGN PATENT DOCUMENTS

| | | |
|---|---|---|
| CA | 2148291 | 11/1996 |
| EP | 1099724 | 5/2001 |
| KR | 2001010716 | 2/2001 |
| WO | WO 0023671 | 4/2000 |

OTHER PUBLICATIONS

Ofice Action, Canadian Intellectual Property Office, Application No. 2,427,897, *Rheology Stabilizer For Cementitious Compositions*, Brenda Zhang (Examiner), Mar. 17, 2010.

*Primary Examiner*—Paul Marcantoni
(74) *Attorney, Agent, or Firm*—Curatolo Sidoti Co., LPA; Salvatore A. Sidoti; D. Ari Sherwin

(57) ABSTRACT

An admixture formulation of at least one polycarboxylate dispersant and at least one naphthalene dispersant is provided. When the polycarboxylate dispersant and the naphthalene dispersant of the admixture formulation are combined at various ratios the admixture formulation reduces the tendency for bleed and segregation in cementitious mixtures without increasing water demand, retarding setting, increasing water sensitivity, promoting high viscosity, or reducing flow retention.

20 Claims, No Drawings

RHEOLOGY STABILIZER FOR CEMENTITIOUS COMPOSITIONS

CROSS REFERENCE TO RELATED APPLICATIONS

This application is a continuation of copending U.S. Ser. No. 12/048,037, filed Mar. 13, 2008, which is a continuation of U.S. Ser. No. 10/423,386, filed Apr. 25, 2003 (abandoned), both of which are hereby incorporated by reference in their entireties.

BACKGROUND

In recent years concrete and mortar systems have been increasingly used in flowable, fluid, or self-consolidating consistencies in an attempt to increase the speed of construction. One method that is used to facilitate placement of these high slump mixtures is pumping. Pumped cementitious compositions such as concrete, mortar or grouts are conveyed by pressure through either rigid pipes or flexible hoses and discharged directly into the required area. Pumping may be used for most concrete construction, but it is especially useful where space or access for construction equipment is limited.

Under pressure and motion, a small amount of water is transmitted from the cementitious composition to the sidewall of the pipe in order to provide a lubricating layer. The only element of a cementitious composition that is pumpable is water, and it is the stability of the water in the mix under pressure that largely determines pumpability. When a cementitious composition blocks a pipeline there is a process of water loss, that is, a process in which the prevailing axial pressure in the pipe forces the water to move faster than the cementitious composition, leaving a portion of it drier than needed for the saturated state. Addition of cement and fine aggregates having grain sizes of less than 300 μm inhibits the migration of water under pumping pressure. Sometimes high contents of cement and fine aggregates increase the flow resistance, the reason being that such mixtures have too much cohesiveness, which produces a high viscosity that prevents the development of an adequate lubricating layer.

After placement of the cementitious composition, the mixture must also remain homogeneous. Settlement of the denser portions of the mixture can involve separation of water (bleeding) as well as stratification of the coarse fractions due to density differences (segregation). Bleeding causes a high water to binder ratio at the top surface of the cementitious composition, as well as deposition of an excess proportion of line material in the upper region of the cementitious composition. This causes lower strength, higher shrinkage, and in applications where the upper surface must support load (such as grouting), the inability of the material to function as intended. Likewise, segregation of the aggregate portion of the cementitious composition produces an inhomogeneous composition with differing properties throughout the installed cementitious composition.

The increase in slump of mortar and concrete mixes can also increase the tendency to lose water as well as allow the settlement of the coarse particles of the mixture (segregation). This water separation from the mixture is known as "bleeding". Both bleeding and segregation can happen under the influence of gravity, as well as be increased through the use of additives commonly used to improve fluidity.

Admixtures may help the process of pumping, such as water-reducing admixtures like sulfonated naphthalene-formaldehyde condensate (SNF) which reduce the flow resistance when used with unchanged water contents, to obtain more fluid consistencies. Water-reducing admixtures improve the dispersion of the cement grains and minimize the agglomeration tendency.

A number of water-soluble polymers have long been used as thickening or stabilizing additives to minimize segregation and bleeding issues of cementing compositions. Such polymers could be alkyl derivatives of cellulose, for example methylcellulose, hydroxymethyl, hydroxyethyl, or hydroxypropyl cellulose, and the like, clays, guar gum, welan gum or other esterified polysaccharides. These water soluble polymers serve as a "suspending aid" by reducing the tendency of aggregates in fresh cementitious compositions to settle, and of mixing water to bleed on the surface. They provide an improved cohesion allowing aggregate particles to remain suspended in the cementitious composition without segregation when subjected to normal movement associated with transportation, pumping, placing, and consolidation by vibration. Nevertheless, all these traditional suspending aids have adverse effects such as impairing the initial workability by increasing water demand and/or viscosity, retarding the setting and hardening of fresh mixes, entraining air, and reducing flow retention.

Therefore, it is desirable to provide an admixture formulation that stabilizes the rheology by reducing bleeding and separation of a cementitious composition without adversely affecting workability, setting, strength and other performance properties.

SUMMARY

An admixture formulation for cementitious compositions is provided that comprises at least one polycarboxylate dispersant combined with at least one naphthalene dispersant, wherein the amount of polycarboxylate dispersant is about 1% to about 99% and the amount of naphthalene dispersant is about 1% to about 99% based on the weight of dry solids. The admixture formulation improves bleeding resistance and reduces segregation in cementitious compositions without producing many of the undesirable side-effects.

A cementitious composition is provided that comprises hydraulic cement, at least one polycarboxylate dispersant and at least one naphthalene dispersant, wherein the amount of polycarboxylate dispersant is about 0.001% to about 10% primary active ingredient and the amount of naphthalene dispersant is about 0.001% to about 10% primary active ingredient based on the total dry weight of cementitious material.

A method is provided for making a cementitious composition comprising forming a mixture of water, hydraulic cement, an amount of about 0.001% to about 10% primary active ingredient of polycarboxylate dispersant, and an amount about 0.001% to about 10% primary active ingredient of naphthalene dispersant based on the total dry weight of cementitious material.

DETAILED DESCRIPTION

A dry or liquid admixture formulation of polycarboxylate copolymer and naphthalene dispersant is provided that controls bleed and segregation in flowable and/or fluid cementitious compositions such as mortars, grouts, toppings and concrete. A cementitious composition containing the admixture formulation is also provided as well as a novel method for preparing such a cementitious composition.

It has now been discovered that an appropriate combination of naphthalene dispersant and polycarboxylate-based polymer provides a more stable cementitious composition with better flow, and little or no water loss or segregation. Furthermore, this new combination does not affect setting and hardening of cementitious compositions. Additionally, an air-entraining agent can be used that improves the plasticity of cementitious compositions and supplements the sand suspension, as the small, stable bubbles entrained in the mixture act like flexible ball bearings. The combination of certain naphthalene dispersants, polycarboxylate dispersant and optionally air-entraining agents provides lower pump pressure, increased fluidity, reduced bleeding and segregation, reduction in internal friction and better setting and hardening features.

Contrary to what is shown in the prior art, that the combination of polycarboxylate dispersant and naphthalene dispersant causes unacceptable gelling by increasing flocculation, we discovered that when polycarboxylate dispersants and naphthalene dispersants are combined at various levels, they interact synergistically to reduce the tendency for bleed and segregation in cementitious mixtures. The present admixture formulation is an improvement over prior art thickeners or rheology modifiers such as cellulose ethers, silica fume, polyacrylamides, polysaccharides, water soluble gums, and clays, in that it does not increase water demand, retard setting, entrain air, increase water sensitivity, promote high viscosity, or reduce flow retention as observed with the prior art thickening agents.

Thickening agents or rheology modifiers are commonly used to address bleeding, sedimentation, segregation and deflocculation in cementitious compositions. Their principle mechanism is an increase in viscosity brought about by the formation of gelled aqueous phases or increased inter-particle attraction from associative or ionic bonding. Depending on the type of thickener used, the time dependency of the shear, the shear rate, and the shear stress; the rheological behavior of the mixture can be Newtonian, Non-Newtonian, viscoelastic, dilatent, pseudoplastic, thixotropic, or rheopectic. Most conventional thickeners/rheology modifiers will significantly increase viscosity and water demand, as well as affect rheological properties that are not desirable with fluid and/or flowable compositions.

Without being limited to theory, it is thought that the synergistic mechanism between naphthalene dispersants and polycarboxylate dispersants is brought about when highly charged sulfonic groups from a naphthalene dispersant, such as those of naphthalene sulfonate formaldehyde condensate, interact with the polyether side chains of the polycarboxylate, causing the cement particles to flocculate. The degree of flocculation and resulting gelation/thickening may be affected by the dosage and the molecular weight of the polycarboxylate dispersant. The longer the ether side chains, the more pronounced the effect.

The naphthalene dispersants used can be any suitable naphthalene dispersant such as naphthalene sulfonate formaldehyde condensate, beta naphthalene sulfonates, or sodium naphthalene sulfate formaldehyde condensate resins, for example LOMAR D® (Cognis Inc., Cincinnati, Ohio).

Some non-polycarboxylate dispersants such as oligomerics, melamine formaldehyde condensate resins, salts of melamine formaldehyde condensate resins, carboxylic acids, salts of carboxylic acids, calcium lignosulfonates, and mixtures thereof do not demonstrate the rheology modifying effects found with naphthalene dispersants. These unaffected non-polycarboxylate dispersants can be used as normal water reducing additives.

In one embodiment, the admixture formulation contains about 1% to about 99% of a naphthalene dispersant based on the total dry weight of the admixture formulation. In another embodiment, the admixture formulation contains about 5% to about 95% naphthalene dispersant based on the total dry weight of the admixture formulation. In a further embodiment, the admixture formulation contains about 10% to about 90% naphthalene dispersant based on the total dry weight of the admixture formulation. In certain embodiments, a cementitious composition contains about 0.001% to about 10% naphthalene dispersant based on the total dry weight of cementitious material. In further embodiments a cementitious composition contains about 0.01% to about 5% naphthalene dispersant based on the total dry weight of cementitious material. In another embodiment a cementitious composition contains about 0.1% to about 2% naphthalene dispersant based on the total dry weight of cementitious material.

Polycarboxylate dispersants are dispersants having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cementitious compositions. Examples of polycarboxylate dispersants can be found in U.S. Pat. No. 6,310,143, U.S. Pat. No. U.S. Pat. Nos. 6,290,770, 6,267,814, U.S. Pat. No. 6,211,317, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114. U.S. Pat. No. 5,753,744, U.S. Pat. No. 5,728,207, U.S. Pat. No. 5,725,657 , U.S. Pat. No. 5,703,174, U.S. Pat. No. 5,665,158, U.S. Pat. No. 5,643,978, U.S. Pat. No. 5,633,298, U.S. Pat. No. 5,583.183, and U.S. Pat. No. 5,393,343, which are incorporated herein by reference. The polycarboxylate high range water reducing dispersants used in the admixture formulation of the present invention may include but are not limited to dispersants or water reducers sold under the trademarks MELFLUX® 1643F and 1641 (SKW Polymers), FC600 (Nippon Shokubai), SD 100 (Takemoto Oil & Fat CO., LTD), Daxad 30S (Hampshire Chemical Corp.), and Shokanal DS3557 (BASF).

In one embodiment, the admixture formulation contains about 1% to about 99% polycarboxylate dispersant based on the total dry weight of the admixture formulation. In another embodiment, the admixture formulation contains about 5% to about 95% polycarboxylate dispersant based on the total dry weight of the admixture formulation. In a further embodiment, the admixture formulation contains about 10% to about 90% polycarboxylate dispersant based on the total dry weight of the admixture formulation. In certain embodiments a cementitious composition contains about 0.001% to about 10% polycarboxylate dispersant based on the total dry weight of cementitious material. In a further embodiment a cementitious composition contains about 0.01% to about 5% polycarboxylate dispersant based on the dry weight of cementitious material. In another embodiment a cementitious composition contains about 0.1% to about 2% polycarboxylate dispersant based on the dry weight of cementitious material.

The polycarboxylate dispersants used in combination with the naphthalene dispersants are at least one of a) a dispersant of Formula (I):

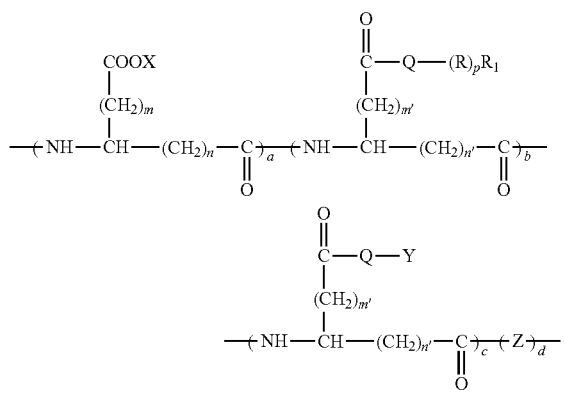

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;
b) a dispersant of Formula (II):

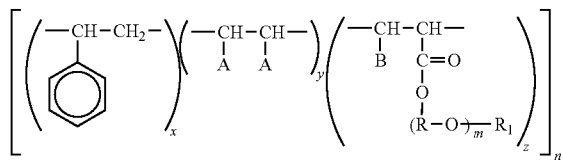

wherein in Formula (II):
A is COOM or optionally in the "y" structure an acid anhydride group (—C—O—CO—) is formed in place of the A groups between the carbon atoms to which the A groups are bonded to form an anhydride;
B is COOM;
M is hydrogen, a transition metal cation, the residue of a hydrophobic polyalkylene glycol or polysiloxane, an alkali metal ion, an alkaline earth metal ion, ferrous ion, aluminum ion, (alkanol) ammonium ion, or (alkyl) ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;
c) a dispersant comprising at least one polymer or a salt thereof having the form of a copolymer of
  i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
  ii) a monomer having the formula $CH{=}CHCH_2{-}(OA)_n$ OR, wherein n is an integer from 1-90 and R is a $C_{1-20}$ alkyl group;
d) a dispersant obtained by copolymerizing 5 to 98% by weight of an (alkoxy)polyalkylene glycol mono(meth) acrylic ester monomer (a) represented by the following general formula (1):

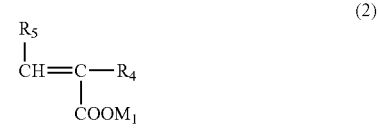

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight:
e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;
f) a dispersant of Formula (III):

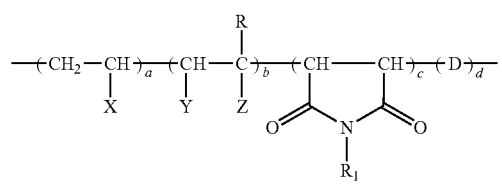

-continued

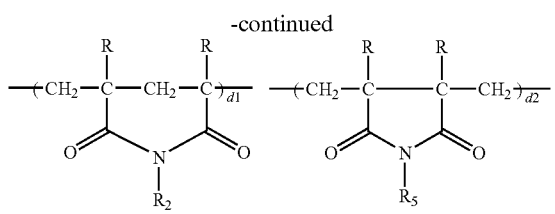

wherein in Formula (III):
D=a component selected from the group consisting of the structure d1, the structure d2, and mixtures thereof;
X=H, CH$_3$, C$_2$ to C$_6$ Alkyl, Phenyl, p-Methyl Phenyl, or Sulfonated Phenyl;
Y=H or —COOM;
R=H or CH$_3$;
Z=H, —SO$_3$M, —PO$_3$M, —COOM, —O(CH$_2$)$_n$OR$_3$ where n=2 to 6, —COOR$_3$, or —(CH$_2$)$_n$OR$_3$ where n=0 to 6,
—CONHR$_3$, —CONHC(CH$_3$)$_2$ CH$_2$SO$_3$M, —COO(CHR$_4$)$_n$OH where n=2 to 6, or —O(CH$_2$)$_n$OR$_4$ wherein n=2 to 6;
R$_1$, R$_2$, R$_3$, R$_5$ are each independently —(CHRCH$_2$O)$_m$R$_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
R$_4$=H, Methyl, C$_2$ to about C$_6$ Alkyl, or about C$_6$ to about C$_{10}$ aryl;
M=H, Alkali Metal, Alkaline Earth Metal, Ammonium, Amine, triethanol amine, Methyl, or C$_2$ to about C$_6$ Alkyl;
a=0 to about 0.8;
b=about 0.2 to about 1.0;
c=0 to about 0.5;
d=0 to about 0.5; and
wherein a, b, c, and d represent the mole fraction of each unit and the sum of a, b, c, and d is 1.0;
g) a dispersant of Formula (IV):

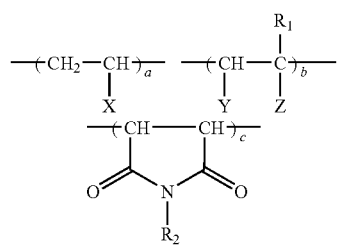

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, CH$_3$, C$_2$ to C$_6$ Alkyl, Phenyl, p-Methyl Phenyl, p-Ethyl Phenyl, Carboxylated Phenyl, or Sulfonated Phenyl;
Y=H, —COOM, —COOH, or W;
W=a hydrophobic defoamer represented by the formula R$_5$O—(CH$_2$CH$_2$O)$_s$—(CH$_2$C(CH$_3$)HO)$_t$—(CH$_2$CH$_2$O)$_u$ where s, t, and u are integers from 0 to 200 with the proviso that t>(s+u) and wherein the total amount of hydrophobic defoamer is present in an amount less than about 10% by weight of the polycarboxylate dispersant;
Z=H, —COOM, —O(CH$_2$)$_n$OR$_3$ where n=2 to 6, —COOR$_3$, —(CH$_2$)$_n$OR$_3$ where n=0 to 6, or —CONHR$_3$;
R$_1$=H, or CH$_3$;
R$_2$, R$_3$, are each independently a random copolymer of oxyethylene units and oxypropylene units of the general formula —(CH(R$_1$)CH$_2$O)$_m$R$_4$ where m=10 to 500 and wherein the amount of oxyethylene in the random copolymer is from about 60% to 100% and the amount of oxypropylene in the random copolymer is from 0% to about 40%;
R$_4$=Methyl, or C$_2$ to C$_8$ Alkyl;
R$_5$=C$_1$ to C$_{18}$ alkyl or C$_6$ to C$_{18}$ alkyl aryl;
M=Alkali Metal, Alkaline Earth Metal, Ammonia, Amine, monoethanol amine, diethanol amine, triethanol amine, morpholine, imidazole;
a=0.01-0.8;
b=0.2-0.99;
c=0-0.5; and
wherein a, b, c represent the mole fraction of each unit and the sum of a, b, and c, is 1;
h) a random copolymer corresponding to the following Formula (V) in free acid or salt form having the following monomer units and numbers of monomer units:

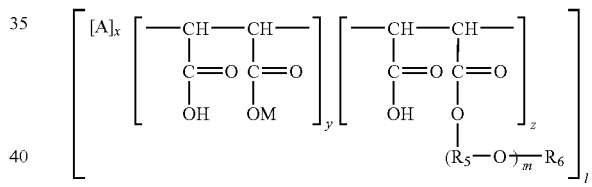

wherein A is selected from the moieties (i) or (ii)

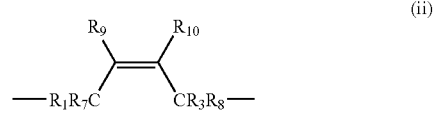

wherein R$_1$ and R$_3$ are selected from substituted benzene, C$_{1-8}$ alkyl, C$_{2-8}$ alkenyl, C$_{2-8}$ alkylcarbonyl, C$_{1-8}$ alkoxy, carboxyl, hydrogen, and a ring, R$_2$ and R$_4$ are selected from the group consisting of hydrogen and C$_{1-4}$ alkyl, wherein R$_1$ and R$_3$ can together with R$_2$ and/or R$_4$ when R$_2$ and/or R$_4$ are C$_{1-4}$ alkyl form the ring;
R$_7$, R$_8$, R$_9$, and R$_{10}$ are individually selected from the group consisting of hydrogen, C$_{1-6}$ alkyl, and a C$_{2-8}$ hydrocarbon chain, wherein R$_1$ and R$_3$ together with R$_7$ and/or R$_8$, R$_9$, and R$_{10}$ form the C$_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol. M must be different from the group —$(R_5O)_m R_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least ne component of the formula 3a or 3b:

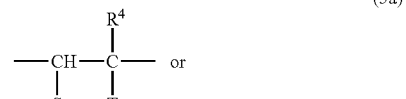

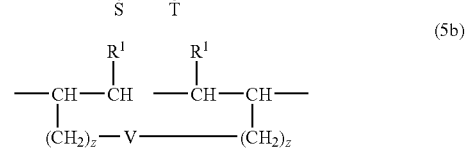

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_t$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR_2$,—$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

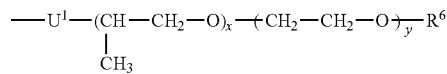

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol of at least one component of the formula 5a or 5b:

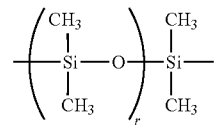

wherein S is a hydrogen atom or —$COOM_a$ or —$COOR_5$, T is —$COOR_5$, —W—$R_7$, —CO—[—NH—$(CH2)_3$—]$_s$—W—$R_7$, —CO—O—$(CH_2)_z$—W—$R_7$, a radical of the general formula:

—$U^1$—(CH—$CH_2$—O)$_x$—($CH_2$—$CH_2$—O)$_y$—$R^6$
　　　　|
　　　　$CH_3$ or —$(CH_2)_z$—V—$(CH_2)_z$—CH=CH—$R_1$, or when S is —$COOR_5$ or —$COOM_a$, $U_1$ is —CO—NHM—, —O— or —$CH_2O$, $U_2$ is —NH—CO—, —O— or —$OCH_2$, V is —O—CO—$C_6H_4$—CO—O— or —W—, and W is

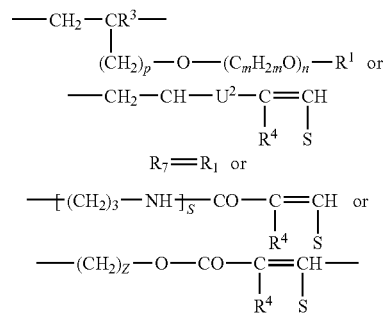

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6$=$R_1$ or

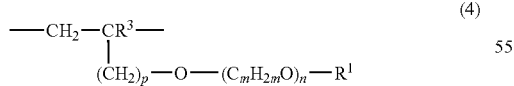

r is 2 to 100, s is 1 or 2, x is 1 to 150, y is 0 to 15 and z is 0 to 4;

iv) 0 to 90 mol % of at least one component of the formula 6a, 6b, or 6c:

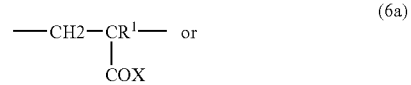

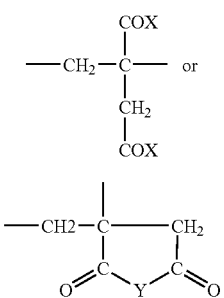

(6b)

(6c)

wherein M is a hydrogen atom, a mono- or divalent metal cation, an ammonium ion or an organic amine residue, a is 1, or when M is a divalent metal cation a is ½;
wherein X is —OM$_a$,
—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
—NH—(C$_m$H$_{2m}$O)$_m$—R$^1$,
—NHR$_2$—N(R$^2$)$_2$ or mixtures thereof in which R$^2$=R$^1$ or —CO—NH$_2$; and
wherein Y is an oxygen atom or —NR$^2$;
j) a copolymer of dicarboxylic acid derivatives and oxyalkylene glycol-alkenyl ethers, comprising:
i) 1 to 90 mol. % of at least one member selected from the group consisting of structural units of Formula 7a and Formula 7b:

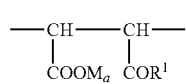
(7a)

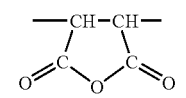
(7b)

wherein M is H, a monovalent metal cation, a divalent metal cation, an ammonium ion or an organic amine;
a is ½ when M is a divalent metal cation or 1 when M is a monovalent metal cation;
wherein R$^1$ is —OM$_a$, or
—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
m is 2 to 4:
n is 1 to 200;
ii) 0.5 to 80 mol. % of the structural units of Formula 8:

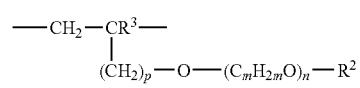
(8)

wherein R$^3$ is H or a C$_{1-5}$ aliphatic hydrocarbon;
p is 0 to 3;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$) M$_{a2}$;
m is 2 to 4;
n is 1 to 200;
iii) 0.5 to 80 mol. % structural units selected from the group consisting of Formula 9a and Formula 9b:

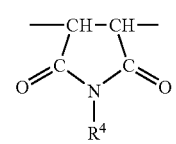
(9a)

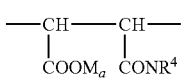
(9b)

wherein R$^4$ is H, C$_{1-20}$ aliphatic hydrocarbon that is optionally substituted with at least one hydroxyl group, —(C$_m$H$_{2m}$O)$_n$—R$^2$, —CO—NH—R$^2$, C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
M is H, a monovalent metal cation, a divalent metal cation, an ammonium ion or an organic amine;
a is ½ when M is a divalent metal cation or 1 when M is a monovalent metal cation;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
m is 2 to 4;
n is to 200;
iv) 1 to 90 mol. % of structural units of Formula 10

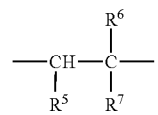
(10)

wherein R$^5$ is methyl, or methylene group, wherein R$^5$ forms one or more 5 to 8 membered rings with R$^7$;
R$^6$ is H, methyl, or ethyl;
R$^7$ is H, a C$_{1-20}$ aliphatic hydrocarbon, a C$_{6-14}$ aryl that is optionally substituted with at least one member selected from the group consisting of —COOM$_a$, —(SO$_3$)M$_a$, and —(PO$_3$)M$_{a2}$, a C$_{5-8}$ cycloaliphatic hydrocarbon, —OCOR$^4$, —OR$^4$, or —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, —(PO$_3$)M$_{a2}$.
In formula (e) the word "derived" does not refer to derivatives in general, but rather to any polycarboxylic acid/salt side chain derivatives of oligoalkyleneglycols, polyalcohols, polyoxyalkylene amines, and polyalkylene glycols that are compatible with dispersant properties and do not destroy the graft polymer.

The preferred substituents in the optionally substituted aryl of formula (j), containing 6 to 14 carbon atoms, are hydroxyl, carboxyl. $C_{1-14}$ alkyl, or sulfonate groups.

The preferred substituents in formula (h) in the substituted benzene are hydroxyl, carboxyl, $C_{1-14}$ alkyl, or sulfonate groups.

In certain embodiments, the suspending effect and some of the dispersing effect is caused by the naphthalene/polycarboxylate interaction and the balance of the dispersing effect is caused by an unaffected non-polycarboxylate dispersant such as oligomerics, melamine formaldehyde condensate resins, salts of melamine formaldehyde condensate resins, carboxylic acids, salts of carboxylic acids, calcium lignosulfonates, and mixtures thereof. The level of the unaffected non-polycarboxylate dispersant can be adjusted to control the flowability of the cementitious mixture, wherein the unaffected non-polycarboxylate dispersant is added without affecting the suspending ability of the polycarboxylate/naphthalene interaction.

The term oligomeric dispersant throughout this specification refers to oligomers that are a reaction product of a component A, optionally component B, and component C that are described in U.S. Pat. No. 6,133,347, U.S. Pat. No. 6,451,881, U.S. Ser. No. 09/629,724 filed on Jul. 31, 2000, and U.S. Ser. No. 10/244,253 filed on Sep. 16, 2002, which are hereby incorporated by reference.

The oligomeric dispersants are a reaction product of component A, optionally component B, and component C;

wherein each component A is independently a nonpolymeric, multi-functional moiety or combination of mono or multifunctional moieties that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly (oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding.

Air entraining materials used to achieve these desired effects can be selected from wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. If air entrainers are to be used they are added in an amount to yield a desired level of air in a cementitious composition and can be any known air entrainer for cement, including natural resin, synthetic resin, and mixtures thereof.

Cementitious materials are materials that alone have hydraulic cementing properties, and set and harden in the presence of water. Included in cementitious materials are ground granulated blast-furnace slag, natural cement, portland cement, modified portland cement, masonry cement, hydraulic hydrated lime, and combinations of these and other materials. By portland cement is meant a hydraulic cement produced by pulverizing clinker, comprising hydraulic calcium silicates, calcium aluminates, and calcium aluminoferrites, and usually containing one or more of the forms of calcium sulfate as an interground addition, and includes portland cement, the specification for which is set forth in ASTM specification C 150, and cements that are chemically similar or analogous to portland cement, the specifications for which are set forth in ASTM specifications C 1157, C 595, and C 845.

Aggregate can be included in the cementitious formulation to provide for mortars which include fine aggregate, and concretes which also include coarse aggregate. The fine aggregates are materials that pass through a Number 4 sieve (ASTM C 125 and ASTM C 33), such as silica sand. The coarse aggregate are materials that are retained on a Number 4 sieve (ASTM C 125 and ASTM C 33), such as silica, quartz, crushed round marble, glass spheres. granite, limestone, calcite, feldspar, alluvial sands, sands or any other durable aggregate, and mixtures thereof. Other types of aggregates can also be used such as metallic particles, heavy weight aggregates, and light weight aggregates such as described in ASTM standards C 330. C 331, C 332 and AC1 International 211.2R, 313R, 304.5R, 304.3R, and 221R.

The bleeding resistance and segregation reduction admixture formulation may comprise other additives or ingredients and should not be limited to the stated formulations. Cement additives that can be added include, but are not limited to: set accelerators, set retarders, air-entraining or air detraining agents, water reducer, corrosion inhibitors, pigments, wetting agents, water soluble polymers, rheology modifying agents, water repellents, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, strength enhancing agents, shrinkage reducing agents, and any other admixture or additive that does not adversely affect the properties of the bleeding resistance and segregation reduction admixture formulation.

A set accelerator, if used in the bleeding resistance and segregation reduction admixture formulation, can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; or a halide salt of an alkali metal or alkaline earth metal (preferably bromide).

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_d CH_2OH]_e$, d is 1 to about 5 and e is 1 to about 3. Examples include. but are not limited to, are monoethanoalamine, diethanolamine and triethanolamine.

The thiosulfate salts have the general formula $M_f(S_2O_3)_g$ where M is alkali metal or an alkaline earth metal or aluminum, and f is 1 or 2 and g is 1 , 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. In one embodiment the carboxylic acid salt is calcium formate.

In one embodiment polyhydroxylalkylamine has the general formula

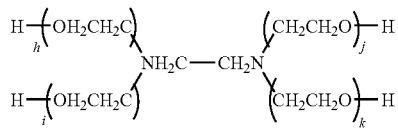

wherein h is 1 to 3, i is 1 to 3, j is 1 to 3, and k is 0 to 3. A preferred polyhydroxyalkylamine is tetrahydroxyethylethylenediamine.

Retarding, or delayed-setting, admixtures are used to retard, delay, or slow the rate of setting of concrete. They can be added to the concrete mix upon initial batching or sometime after the hydration process has begun. Retarders are commonly used to offset the accelerating effect of hot weather on the setting of concrete, to delay the initial set of concrete or grout when difficult conditions of placement occur or problems of delivery to the job site, to allow time for special finishing processes or to aid in the reclamation of concrete left over at the end of the work day. Most retarders also act as water reducers and can also be used to entrain some air into concrete.

The retarder can include but is not limited to an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427.617 and 5,203,919, incorporated herein by reference.

Air detrainers are used to decrease the air content in the cementitious composition. Examples of air detrainers that can be utilized include, but are not limited to tributyl phosphate, dibutyl phthalate, octyl alcohol, water-insoluble esters of carbonic and boric acid, acetylenic diols, ethylene oxide-propylene oxide block copolymers, lignosulfonates, hydroxylated carboxylic acids, lignin, borax, gluconic, tartaric and other organic acids and their corresponding salts, phosphonates, certain carbohydrates and silicones.

Corrosion inhibitors in concrete serve to protect embedded reinforcing steel from corrosion. The high alkaline nature of the concrete causes a passive and noncorroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that has low cement contents, high water-cement ratios, or a deficiency of fines in the aggregate portion. These admixtures retard moisture penetration into dry concrete and include certain soaps, stearates, waxes, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Finely divided mineral admixtures are materials in powder or pulverized form added to concrete before or during the mixing process to improve or change some of the plastic or hardened properties of portland cement concrete. The finely divided mineral admixtures can be classified according to their chemical or physical properties as: cementitious materials; pozzolans; pozzolanic and cementitious materials: and nominally inert materials.

A pozzolan is a siliceous or aluminosiliceous material that possesses little or no cementitious value but will, in the presence of water and in finely divided form, chemically react with the calcium hydroxide produced during the hydration of portland cement to Form materials with cementitious properties. Diatomaceous earth, opaline cherts, clays, shales, fly ash, silica fume, volcanic tuffs and pumicites are some of the known pozzolans. Natural pozzolan is a term of art used to define the pozzolans that occur in nature, such as volcanic tuffs, pumices, trasses, diatomaceous earths, opaline, cherts, and some shales. Fly ash is defined in ASTM C618, Alkali-reactivity reducers can reduce the alkali-aggregate reaction and limit the disruptive expansion forces that this reaction can produce in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

In the construction field, many methods of protecting concrete from tensile stresses and subsequent cracking have been developed through the years. One modern method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon. polyethylene, polyester, rayon, high-strength aramid, or mixtures thereof.

A shrinkage reducing agent which can be used in the cementitious composition may include but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD PW® shrinkage reducing agent is preferred and is available from Master Builders Inc. of Cleveland, Ohio.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

EXAMPLES

The samples in Tables 1-5 were prepared using a dry mixture that comprised cementitious binder, polycarboxylate high range water reducing dispersant, sulfonated naphthalene-formaldehyde condensate, and additives. The dry mixture was added to water and mixed for about 4 minutes in a Hobart paddle mixer. After mixing, static bleed, workability, flow, and segregation were measured.

Table 1 summarizes the bleed amount of water of sample pastes that comprised 1500 gm of Type I/II Portland cement and had an initial volume of 800 ml. The bleed amount of the pastes was determined in accordance with ASTM C 940.

TABLE 1

|  | Sample | | | |
| --- | --- | --- | --- | --- |
|  | S1 | S2 | S3 | S4 |
| SNF (gm) | 11.25 | 11.25 | — | 6.0 |
| PC (gm) | — | 6.75 | 11.25 | 11.25 |
| W/C ratio | 0.5 | 0.5 | 0.40 | 0.40 |

TABLE 1-continued

|  | Sample | | | |
| --- | --- | --- | --- | --- |
|  | S1 | S2 | S3 | S4 |
| Volume of Bleed Water (ml) | | | | |
| ½ hr | 40 | 10 | 20 | 10 |
| 1 hr | 50 | 13 | 20 | 10 |
| 1.5 hr | 60 | 20 | 30 | 10 |
| 2 hr | 70 | 20 | 30 | 10 |

PC-polycarboxylate dispersant with ether group
SNF-naphthalene sulfonate formaldehyde condensate dispersant Table 1 demonstrates that the combination of polycarboxylate dispersant and sulfonated naphthalene-formaldehyde condensate dispersant (S2 and S4) reduces the bleeding of water from cementitious compositions as compared to using either a polycarboxylate dispersant (S3) or sulfonated naphthalene-formaldehyde condensate dispersant (S1) alone.

In Table 2 grout mixtures were prepared that comprised 2100 gm 10-20 Silica Sand and 1400 gm Type I/II Portland cement. The flow was determined in accordance with ASTM C 939.

TABLE 2

|  | Sample | |
| --- | --- | --- |
|  | S5 | S6 |
| SNF (gm) | 10.5 | 10.5 |
| PC (gm) | — | 2.1 |
| Flow (sec) | not measurable due to segregation | 15.32 |
| Bleed | severe | slight |
| Segregation | severe | none |

PC-polycarboxylate dispersant with ether group
SNF-naphthalene sulfonate formaldehyde condensate dispersant Table 2 demonstrates the suspending properties of the admixture formulation. The combination of polycarboxylate dispersant and naphthalene sulfonate formaldehyde condensate dispersant (S6) decreased the bleed and segregation of the grout mixture as compared to use of naphthalene sulfonate formaldehyde condensate dispersant alone as shown in Sample 5.

The mortar mixtures in Table 3 had a water/cement (w/c) ratio of 0.35 and comprised 600 gm of 16-35 Silica Sand and 900 gm of Type I/II Portland cement. The mortar mixtures were prepared with various polycarboxylate (PC) dispersants to demonstrate the flow modification and anti-segregation properties of the invention. The flow was determined in accordance with ASTM C 827 using an ASTM C 230 flow table. Additionally, the maximum measurable flow is 148% and values higher than this indicate the material flowed off the table. Segregation was determined visually.

TABLE 3

|  | Sample | | | | | |
| --- | --- | --- | --- | --- | --- | --- |
|  | S7 | S8 | S9 | S10 | S11 | S12 |
| SNF (gm) | 4.5 | 4.5 | — | 4.5 | 4.5 | 4.5 |
| PC1 (gm) | — | 1 | — | — | — | — |
| PC2 (gm) | — | — | 1 | — | — | — |
| PC3 (gm) | — | — | — | 1 | — | — |

TABLE 3-continued

| | Sample | | | | | |
|---|---|---|---|---|---|---|
| | S7 | S8 | S9 | S10 | S11 | S12 |
| PC4 (gm) | — | — | — | — | 1 | — |
| PC5 (gm) | — | — | — | — | — | 1 |
| % flow at 0 drops | >148 | 104 | 116 | 98.5 | 90 | 89 |
| segregation | yes (severe) | no | no | no | no | no |

PC1 = Melflux 1643F PC
PC2 = Sokalan DS 3557 PC
PC3 = SD 100 PC
PC4 = Daxad 30S PC
PC5 = FC600 PC
SNF = naphthalene sulfonate formaldehyde condensate dispersant Table 4 demonstrates the flow modification properties of the admixture formulation with a non-Portland cement binder with mortar mixtures that comprised 600 gm Silica Sand and 400 gm Calcium Sulfate Hemi-Hydrate. The flow was determined in accordance with ASTM C 827 using an ASTM C 230 flow table.

TABLE 4

| | Sample | | |
|---|---|---|---|
| | S13 | S14 | S15 |
| SNF (gm) | | 1.6 | 1.6 |
| PC (gm) | — | — | 0.8 |
| % mix water | 12 | 12 | 12 |
| % flow at 5 drops | 51 | 140 | 86 |

PC-polycarboxylate dispersant with ether group
SNF-naphthalene sulfonate formaldehyde condensate dispersant The mortar mixtures of Table 5, comprising 600 gm of 16-36 Silica Sand and 400 gm high alumina cement demonstrated the flow modification properties of the admixture formulation with a non-Portland cement binder. The flow was determined in accordance with ASTM C 827 using an ASTM C 230 flow table.

TABLE 5

| | Sample | | |
|---|---|---|---|
| | S16 | S17 | S18 |
| SNF (gm) | | 4 | 4 |
| PC (gm) | | — | 0.4 |
| % mix water | 15 | 15 | 15 |
| % flow at 5 drops | 108 | >148 | 116 |
| bleed | none | severe | none |
| segregation | none | severe | none |

PC-polycarboxylate dispersant with ether group
SNF-naphthalene sulfonate formaldehyde condensate dispersant The concrete mixtures of Tables 6-8 were prepared in batches of 40 liters using a vertical axis mixer. Aggregates were placed in a mixer followed by about 50% of the total mix water and mixed for 1 minute, then cement, admixtures, fiber and the remaining 50% of the total water and mixed for about 1 minute. The mixing was stopped for 1 minute to allow false set, if present, to take place. Then the mixing was continued for another 1 minute.

To compare the effects of the polycarboxylate/naphthalene dispersants and a thickening agent such as hydroxyethyl cellulose in concrete, mixtures were measured for initial slump according to ASTM C 143, density was measured according to ASTM C 138, bleeding was measured according to ASTM C 232, and the time of initial and final setting were measured according to ASTM C 403. Sedimentation tendency was visually evaluated in accordance with comparative criteria in 3 categories, namely absent, moderate and strong. Compressive strength was evaluated in 150 mm steel cubes cast and cured at 20° C. and 95% relative humidity.

The concrete mixtures in Table 6 contained the following components:

| Portland cement 32.5 II/AL | 250 Kg |
|---|---|
| Sand 0-4 mm | 950 Kg |
| Crushed gravel 4-12 mm | 340 Kg |
| Rounded gravel 20-25 mm | 610 Kg |
| SNF | 2.5 Kg (1% cement dosage) |
| Air entrainer | 0.5 Kg |
| Water | 175 Kg (w/c ratio 0.7) |

*SNF-sulfonated naphthalene-formaldehyde condensate

TABLE 6

| Sample | HEC Kg | PC Kg | Slump test cm | Density Kg/m3 | Bleeding % on volume | Sedimentation tendency | Setting Time Minutes | | Compressive strength MPa | | |
|---|---|---|---|---|---|---|---|---|---|---|---|
| | | | | | | | Final | Initial | 1 day | 7 days | 28 days |
| S19 | — | — | 25 | 2320 | 5 | moderate | 420 | 570 | 5 | 19 | 27 |
| S20 | 0.1 | — | 15 | 2290 | 0 | absent | 549 | 700 | 2 | 12 | 25 |
| S21 | — | 0.1 | 25 | 2325 | 0 | absent | 410 | 570 | 5 | 20 | 27 |
| S22 | — | 0.2 | 23 | 2320 | 0 | absent | 420 | 580 | 5 | 19 | 28 |
| S23 | — | 0.5 | 11 | 2315 | 0 | absent | 430 | 590 | 4 | 18 | 27 |
| S24 | — | 1 | 5 | 2315 | 0 | absent | 430 | 590 | 4 | 18 | 26 |

HEC = hydroxyethyl cellulose
PC = polycarboxylate dispersant

The fiber-reinforced concrete mixtures in Table 7 contained the following components:

| | |
|---|---|
| cement 52.5 I | 315 Kg |
| sand 0-4 mm | 1000 Kg |
| pea gravel 4-10 mm | 820 Kg |
| SNF | 10 Kg |
| Alkali Resistant Glass Fiber | 8 Kg |
| Water | 190 Kg (w/c ratio 0.6) |

*SNF-sulfonated naphthalene-formaldehyde condensate

TABLE 7

| Sample | HEC Kg | PC Kg | Slump test cm | Density Kg/m3 | Bleeding % on volume | Sedimentation tendency | Setting Time Minutes Initial | Setting Time Minutes Final | Compressive strength MPa 1 day | Compressive strength MPa 7 days | Compressive strength MPa 28 days |
|---|---|---|---|---|---|---|---|---|---|---|---|
| S25 | — | — | 23 | 2340 | 3 | moderate | 450 | 580 | 12 | 39 | 54 |
| S26 | 0.2 | — | 13 | 2300 | 0 | absent | 530 | 650 | 8 | 32 | 49 |
| S27 | — | 0.2 | 23 | 2330 | 0 | absent | 440 | 570 | 13 | 40 | 55 |
| S28 | — | 0.5 | 21 | 2335 | 0 | absent | 450 | 590 | 12 | 40 | 55 |
| S29 | — | 1.5 | 10 | 2330 | 0 | absent | 460 | 600 | 12 | 39 | 54 |

HEC = hydroxyethyl cellulose
PC = polycarboxylate dispersant

The self-compacting concrete mixtures in Table 8 contained the following components:

| | |
|---|---|
| Portland cement 42.5 II/AL | 320 Kg |
| Fly ash | 200 Kg |
| Sand 0-4 mm | 960 Kg |
| Crushed gravel 4-12 mm | 280 Kg |
| Rounded gravel 10-16 mm | 540 Kg |
| SNF | 7 Kg (1.35% on binder dosage) |
| Water | 190 Kg (w/c ratio 0.59) |

*SNF-sulfonated naphthalene-formaldehyde condensate

TABLE 8

| Sample | HEC Kg | PC Kg | Slump flow test cm | Density Kg/m3 | Bleeding % on volume | Sedimentation tendency | Setting time Minutes Initial | Setting time Minutes Final | Compressive strength MPa 1 day | Compressive strength MPa 7 days | Compressive strength MPa 28 days |
|---|---|---|---|---|---|---|---|---|---|---|---|
| S30 | — | — | 62 | 2420 | 6 | strong | 480 | 660 | 12 | 32 | 40 |
| S31 | 0.2 | — | 50 | 2430 | 0 | absent | 580 | 780 | 7 | 28 | 36 |
| S32 | — | 0.2 | 61 | 2425 | 0 | absent | 470 | 650 | 12 | 31 | 40 |
| S33 | — | 0.4 | 60 | 2420 | 0 | absent | 490 | 670 | 12 | 32 | 41 |
| 34S | — | 1.0 | 35 | 2425 | 0 | absent | 490 | 670 | 11 | 31 | 39 |

HEC = hydroxyethyl cellulose
PC = polycarboxylate dispersant

Tables 6-8 demonstrate that the addition of a thickening agent such as hydroxyethyl cellulose, polycarboxylate/naphthalene dispersants stop the bleeding of the concrete mixtures. However, in contrast to the mixtures containing polycarboxylate/naphthalene dispersants, those that contained hydroxyethyl cellulose had reduced workability and compressive strength with increased setting time. The mixtures containing the polycarboxylate/naphthalene dispersants did not have any of the adverse effects of the mixture containing hydroxyethyl cellulose.

It should be appreciated that there is no limitation to the specific embodiments described above, but includes variations, modifications and equivalent embodiments defined by the following claims. The embodiments disclosed are not necessarily in the alternative, as various embodiments of the invention may be combined to provide desired characteristics or results.

What is claimed is:

1. A method for preparing cementitious compositions which exhibit bleeding resistance and reduced segregation without decreased fluidity comprising:

providing an admixture comprising a synergistic combination of about 2% to about 65% of at least one polycarboxylate copolymer dispersant and about 35% to about 98% of at least one naphthalene dispersant selected from beta naphthalene sulfonate, naphthalene sulfonate formaldehyde condensate, and sodium naphthalene sulfate formaldehyde condensate resin; and mixing the admixture formulation with hydraulic cement and water to produce a cementitious composition.

2. The method of claim 1, wherein the amount of polycarboxylate dispersant primary active ingredient is about 0.001% to about 10% and the amount of naphthalene dispersant primary active ingredient is about 0.001% to about 10% primary active ingredient based on the total dry weight of cementitious material.

3. The method of claim 1, wherein the amount of polycarboxylate dispersant is about 0.01% to about 5% and the amount of naphthalene dispersant is about 0.01% to about 5% based on the total dry weight of cementitious material.

4. The method of claim 1, wherein the amount of polycarboxylate dispersant is about 0.1% to about 2% and the amount of naphthalene dispersant is about 0.1% to about 2% based on the dry weight of cementitious material.

5. The method of claim 1, wherein the polycarboxylate dispersant is at least one of:

a) a dispersant of Formula (I):

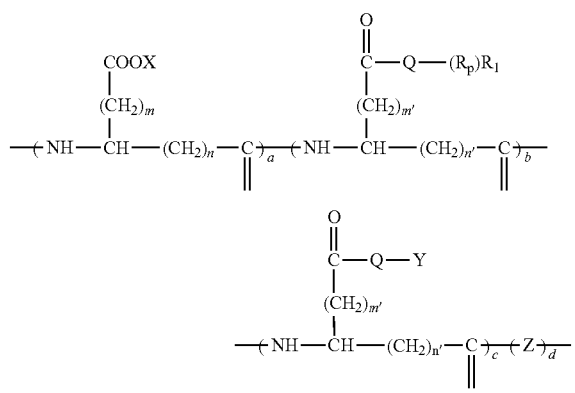

wherein in Formula (I)

X comprises at least one of hydrogen, an alkali earth metal ion, an alkaline earth metal ion, ammonium ion, or amine;

R comprises at least one of $C_1$ to $C_6$ alkyl(ene) ether or mixtures thereof or $C_1$ to $C_6$ alkyl(ene) imine or mixtures thereof;

Q comprises at least one of oxygen, NH, or sulfur;

p comprises a number from 1 to about 300 resulting in at least one of a linear side chain or branched side chain;

$R_1$ comprises at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y comprises at least one of hydrogen, an alkali earth metal ion, an alkaline earth metal ion, ammonium ion, amine, a hydrophobic hydrocarbon or polyalkylene oxide moiety that functions as a defoamer;

m, m', m'', n, n', and n'' are each independently 0 or an integer between 1 and about 20;

Z comprises a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

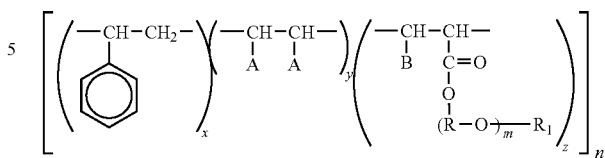

wherein in Formula (II):

A comprises COOM or optionally in the "y" structure an acid anhydride group (—CP—O—CO—) is formed in place of the A groups between the carbon atoms to which the A groups are bonded to form an anhydride;

B is COOM;

M comprises at least one of hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R comprises a alkylene radical;

R1 comprises a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and ii) a monomer having the formula $CH_2$=$CHCH_2$—$(OA)_nOR$, wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (I):

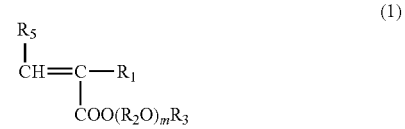

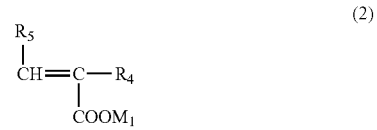

wherein $R_1$ comprises a hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ comprises a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;
e) a graft polymer comprising a polycarboxylic acid or a salt thereof, having side chains derived from at least one species selected from the group consisting of oligoalkyleneglycols, polyalcohols, polyoxyalkylene amines, and polyalkylene glycols;
f) a dispersant of Formula (III):

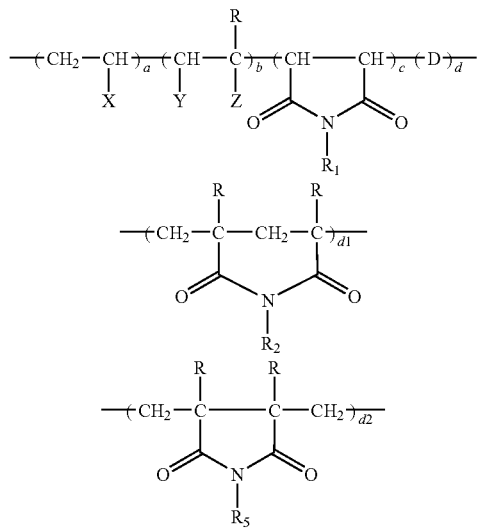

wherein in Formula (III):
D comprises at least one of a component selected from the group consisting of the structure d1, the structure d2, and mixtures thereof;
X comprises at least one of H, $CH_3$, $C_2$ to $C_6$ Alkyl, Phenyl, p-Methyl Phenyl, or Sulfonated Phenyl;
Y comprises at least one of H or —COOM;
R comprises at least one of H or $CH_3$;
Z comprises at least one of H, —$SO_3M$, —$PO_3M$, —COOM, —$O(CH_2)_nOR_3$ where n=2 to 6, —$COOR_3$, or —$(CH_2)_nOR_3$ where n=0 to 6,
—$CONHR_3$, —$CONHC(CH_3)_2$ $CH_2SO_3M$, —COO $(CHR_4)_nOH$ where n=2 to 6, or —$O(CH_2)_nOR_4$ wherein n=2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$ comprises at least one of H, Methyl, $C_2$ to about $C_6$ Alkyl, or about $C_6$ to about $C_{10}$ aryl:
M comprises at least one of H, Alkali Metal, Alkaline Earth Metal, Ammonium, Amine, triethanol amine, Methyl, or $C_2$ to about $C_6$ Alkyl;
a comprises from 0 to about 0.8;
b comprises from about 0.2 to about 1.0;
c comprises from 0 to about 0.5;
d comprises from 0 to about 0.5; and
wherein a, b, c, and d represent the mole fraction of each unit and the sum of a, b, c, and d is 1.0;

g) a dispersant of Formula (IV):

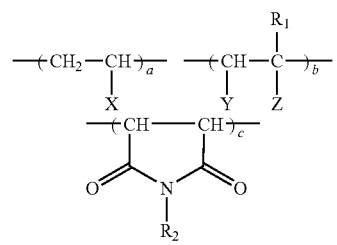

wherein in Formula (IV):
the "b" structure comprises one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X comprises at least one of H, $CH_3$, $C_2$ to $C_6$ Alkyl, Phenyl, p-Methyl Phenyl, p-Ethyl Phenyl, Carboxylated Phenyl, or Sulfonated Phenyl;
Y comprises at least one of H, —COOM, —COOH, or W;
W comprises at least one of a hydrophobic defoamer represented by the formula
$R_5O—(CH_2CH_2O)_s—(CH_2C(CH_3)HO)_t—(CH_2O)_u$
where s, t, and u are integers from 0 to 200 with the proviso that t>(s+u) and wherein the total amount of hydrophobic defoamer is present in an amount less than about 10% by weight of the polycarboxylate dispersant;
Z comprises at least one of H, —COOM, —$O(CH_2)_nOR_3$ where n=2 to 6, —$COOR_3$, —$(CH_2)_nOR_3$ where n=0 to 6, or —$CONHR_3$;
$R_1$ comprises at least one of H, or $CH_3$;
$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;
$R_4$ comprises at least one of H, Methyl, or $C_2$ to $C_8$ Alkyl;
$R_5$ comprises at least one of $C_1$ to $C_{18}$ alkyl or $C_6$ to $C_{18}$ alkyl aryl;
M comprises at least one of Alkali Metal, Alkaline Earth Metal, Ammonia, Amine, monoethanol amine, diethanol amine, triethanol amine, morpholine, imidazole:
a comprises from 0.01-0.8;
b comprises from 0.2-0.99;
c comprises from 0-0.5; and
wherein a, b, c represent the mole fraction of each unit and the sum of a, b, and c, is 1;
h) a random copolymer corresponding to the following Formula (V) in free acid or salt form having the following monomer units and numbers of monomer units:

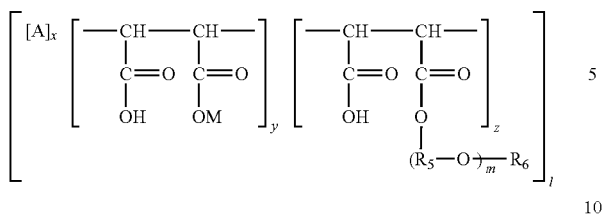

wherein A is selected from the moieties (i) or (ii)

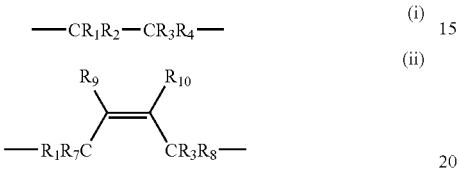

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100:

i) a copolymer of oxyalkyleneglycol-alkenyl ethers and unsaturated dicarboxylic acids, comprising:

i) 0 to 90 mol % of at least one component of the formula 3a or 3b:

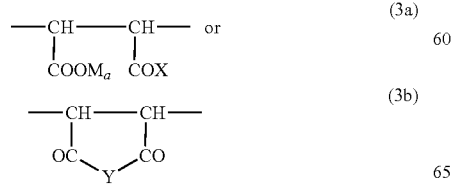

wherein M is a hydrogen atom, a mono- or divalent metal cation, an ammonium ion or an organic amine residue, a is 1, or when M is a divalent metal cation a is ½;

wherein X is —$OM_a$,
—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
—$NHR_2$, —$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

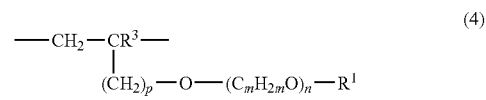

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

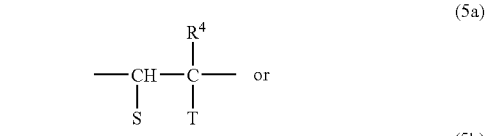

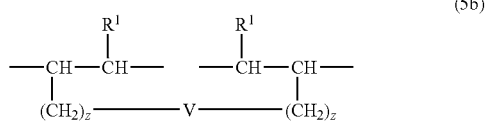

wherein S is a hydrogen atom or —$COOM_a$ or —$COOR_5$, T is —$COOR_5$, —W—$R_7$, —CO—[—NH—(CH2)3)-]$_s$—W—$R_7$, —CO—O—$(CH_2)_z$—W—$R_7$, a radical of the general formula:

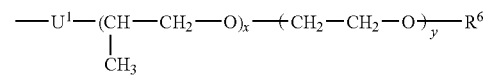

or —$(CH_2)_z$—V—$(CH_2)_z$—CH=CH—$R_1$, or when S is —$COOR_5$ or —$COOM_a$, $U_1$ is —CO—NHM—, —O— or —$CH_2O$, $U_2$ is —NH—CO—, —O— or —$OCH_2$, V is —O—CH—$C_6H_4$—CO—O— or —W—, and W is

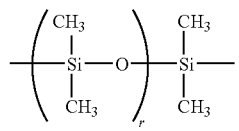

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

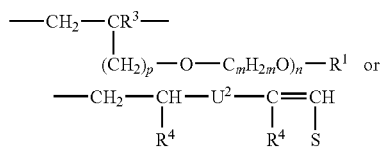

$R_7$ comprises at least one of $R_1$ or

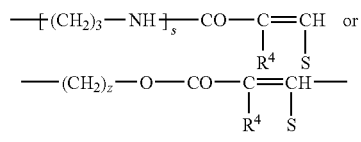

r is 2 to 100, s is 1 or 2, x is 1 to 150, y is 0 to 15 and z is 0 to 4;

iv) 0 to 90 mol % of at least one component of the formula 6a, 6b, or 6c:

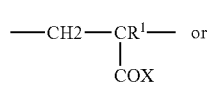 (6a)

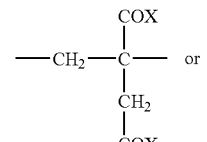 (6b)

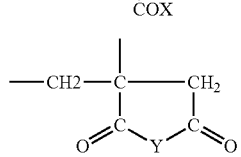 (6c)

wherein M is a hydrogen atom, a mono- or divalent metal cation, an ammonium ion or an organic amine residue, a is 1, or when M is a divalent metal cation a is ½;

wherein X is $—OM_a$, $—O—(C_mH_{2m}O)_n—R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, $—NH—(C_mH_{2m}O)_n—R^1$, $—NHR_2, —N(R^2)_2$ or mixtures thereof in which $R^2=R^1$ or $—CO—NH_2$; and wherein Y is an oxygen atom or $—NR^2$;

j) a copolymer of dicarboxylic acid derivatives and oxyalkylene glycol-alkenyl ethers, comprising:

i) 1 to 90 mol. % of at least one member selected from the group consisting of structural units of Formula 7a and Formula 7b:

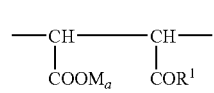 (7a)

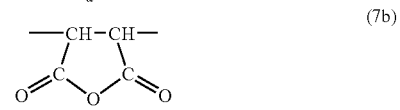 (7b)

wherein M is H, a monovalent metal cation, a divalent metal cation, an ammonium ion or an organic amine;

a is ½ when M is a divalent metal cation or 1 when M is a monovalent metal cation;

wherein $R^1$ is $—OM_a$, or $—O—(C_mH_{2m}O)_n—R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

ii) 0.5 to 80 mol. % of the structural units of Formula 8:

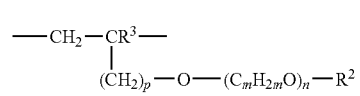 (8)

wherein W is H or a $C_{1-5}$ aliphatic hydrocarbon;

p is 0 to 3;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

iii) 0.5 to 80 mol. % structural units selected from the group consisting of Formula 9a and Formula 9b:

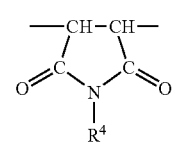 (9a)

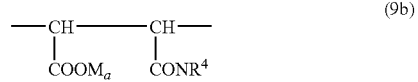 (9b)

wherein $R^4$ is H, $C_{1-20}$ aliphatic hydrocarbon that is optionally substituted with at least one hydroxyl group, $—(C_mH_{2m}O)_n—R^2$, $—CO—NH—R^2$, $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —$COOM_a$, —$(SO_3)M_a$, and —$(PO_3)M_{a2}$;

m is 2 to 4;

n is 1 to 200;

iv) 1 to 90 mol. % of structural units of Formula 10

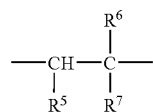

(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of —$COOM_a$, —$(SO_3)M_a$, and —$(PO_3)M_{a2}$, a $C_{5-8}$ cycloaliphatic hydrocarbon, —$OCOR^4$, —$OR^4$, or —$COOR^4$, wherein $R^4$ is H, a $C_{1-20}$ aliphatic hydrocarbon that is optionally substituted with at least one —OH, —$(C_mH_{2m}O)_n$—$^2$, $C_{5-8}$ cycloaliphatic hydrocarbon, or a $C_{6-14}$ aryl residue that is optionally substituted with a member selected from the group consisting of —$COOM_a$, —$(SO_3)M_a$, —$(PO_3)M_{a2}$.

6. The method of claim 1, wherein the naphthalene dispersant is at least one of naphthalene sulfonate formaldehyde condensate, beta naphthalene sulfonates, or sodium naphthalene sulfate formaldehyde condensate resins.

7. The method of claim 1, wherein the hydraulic cement is selected from the group consisting of portland cement, masonry cement, alumina cement, refractory cement, magnesia cement, calcium sulfate hemi-hydrate cement, calcium sulfoaluminate cement, and mixtures thereof.

8. The method of claim 1, further comprising adding a cement admixture or additive to the cementitious composition that is selected from the group consisting of set accelerators, set retarders, air-entraining or air detraining agents, corrosion inhibitors, pigments, wetting agents, water soluble polymers, rheology modifying agents, water repellents, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, strength enhancing agents, shrinkage reducing agents, aggregates, pozzolans and mixtures thereof.

9. The method of claim 8, wherein the set accelerator comprises at least one of:

a) a nitrate salt of an alkali metal, alkaline earth metal, or aluminum;

b) a nitrite salt of an alkali metal, alkaline earth metal, or aluminum;

c) a thiocyanate of an alkali metal, alkaline earth metal or aluminum;

d) an alkanolamine;

e) a thiosulphate of an alkali metal, alkaline earth metal, or aluminum;

f) hydroxide of an alkali metal, alkaline earth metal, or aluminum;

g) a carboxylic acid salt of an alkali metal, alkaline earth metal, or aluminum;

h) a polyhydroxylalkylamine; or i) a halide salt of an alkali metal or alkaline earth metal.

10. The method of claim 8, wherein the set retarder is selected from the group consisting of an oxy-boron compound, lignin, a polyphosphonic acid, a carboxylic acid, a hydroxycarboxylic acid, polycarboxylic acid, hydroxylated carboxylic acid, fumaric, itaconic. malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof.

11. The method of claim 8, wherein the aggregate is at least one of silica, quartz, crushed round marble, glass spheres, granite, limestone, calcite, feldspar, alluvial sands, heavy weight aggregate, light weight aggregate, metallic particles, and sand.

12. The method of claim 8, wherein the pozzolan is at least one of natural pozzolan, fly ash, silica fume, calcined clay, and blast furnace slag.

13. The method of claim 8, wherein the composition further comprises at least one oligomeric dispersant, wherein the oligomeric dispersant is a reaction product of component A, optionally component B, and component C:

wherein each component A is independently a nonpolymeric, multi-functional moiety or combination of mono or multifunctional moieties that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), polyethylene imines), poly(acrylamides), polyoxazoles, and mixtures thereof.

14. A method for preparing cementitious compositions which exhibit bleeding resistance and reduced segregation without decreased fluidity comprising:
   providing an admixture comprising a synergistic combination of about 2% to about 65% of at least one polycarboxylate copolymer dispersant and about 35% to about 98% of at least one naphthalene dispersant comprising charged sulfonic acid groups; and
   mixing the admixture formulation with hydraulic cement and water to produce a cementitious composition.

15. The method of claim 14, wherein the amount of polycarboxylate dispersant primary active ingredient is about 0.001% to about 10% and the amount of naphthalene dispersant primary active ingredient is about 0.001% to about 10% primary active ingredient based on the total dry weight of cementitious material.

16. The method of claim 14, wherein the amount of polycarboxylate dispersant is about 0.01% to about 5% and the amount of naphthalene dispersant is about 0.01% to about 5% based on the total dry weight of cementitious material.

17. The method of claim 14, wherein the amount of polycarboxylate dispersant is about 0.1% to about 2% and the amount of naphthalene dispersant is about 0.1% to about 2% based on the dry weight of cementitious material.

18. The method of claim 14, wherein the polycarboxylate dispersant is at least one of:
   a) a dispersant of Formula (I):

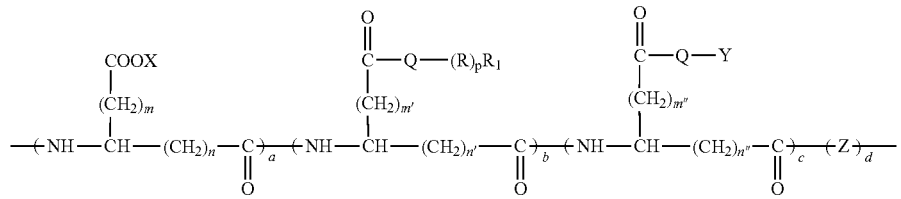

wherein in Formula (I)

X comprises at least one of hydrogen, an alkali earth metal ion, an alkaline earth metal ion, ammonium ion, or amine;

R comprises at least one of $C_1$ to $C_6$ alkyl(ene) ether or mixtures thereof or $C_1$ to $C_6$ alkyl(ene) imine or mixtures thereof;

Q comprises at least one of oxygen, NH, or sulfur;

p comprises a number from 1 to about 300 resulting in at least one of a linear side chain or branched side chain;

$R_1$ comprises at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine. or epoxy;

Y comprises at least one of hydrogen, an alkali earth metal ion, an alkaline earth metal ion, ammonium ion, amine, a hydrophobic hydrocarbon or polyalkylene oxide moiety that functions as a defoamer;

m, ', m", n, n', and n" are each independently 0 or an integer between l and about 20;

Z comprises a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c. and d equal one, wherein a, b, c, and d are each a value greater than or equal to zero and less than one, and at least two of a, b, c, and d are greater than zero;

b) a dispersant of Formula (II):

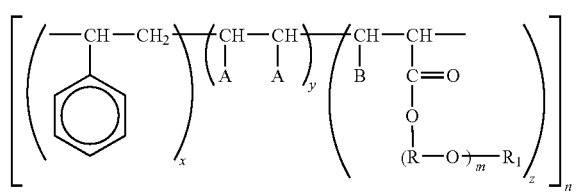

wherein in Formula (II):

A comprises COOM or optionally in the "y" structure an acid anhydride group (—CO—O—CO—) is formed in place of the A groups between the carbon atoms to which the A groups are bonded to form an anhydride;

B is COOM:

M comprises at least one of hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R comprises a $C_{2-6}$ alkylene radical;

R1 comprises a $C_{1-20}$ alkyl, $C_{6-9}$ cycloalkyl, or phenyl group;

x, y, and z are a number from 0.01 to 100;

in is a number from 1 to 100; and n is a number from 10 to 100;

c) a dispersant comprising at least one polymer or a salt thereof having the form of a copolymer of
   i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
   ii) a monomer having the formula $CH_2$=$CHCH_2$—$(OA)_nOR$, wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (I):

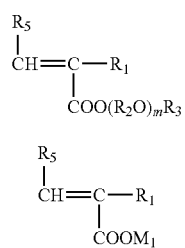

wherein $R_1$ comprises a hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ comprises a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer comprising a polycarboxylic acid or a salt thereof, having side chains derived from at least one species selected from the group consisting of oligoalkyleneglycols, polyalcohols, polyoxyalkylene amines, and polyalkylene glycols;

f) a dispersant or Formula (III):

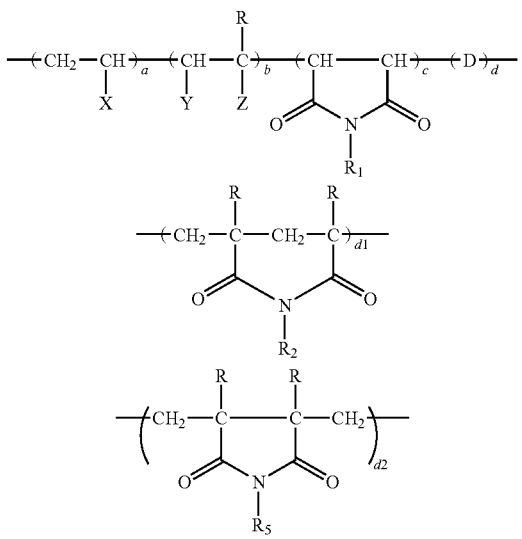

wherein in Formula (III):

D comprises at least one of a component selected from the group consisting of the structure d1, the structure d2, and mixtures thereof;

X comprises at least one of H, $CH_3$, $C_2$ to $C_6$ Alkyl, Phenyl, p-Methyl Phenyl, or Sulfonated Phenyl;

Y comprises at least one of H or —COOM;

R comprises at least one of H or $CH_3$;

Z comprises at least one of H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —$COO(CHR_4)_nOH$ where n=2 to 6, or —$O(CH_2)_nOR_4$ wherein n=2 to 6;

$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$ comprises at least one of H, Methyl, $C_2$ to about $C_6$ Alkyl, or about $C_6$ to about $C_{10}$ aryl;

M comprises at least one of H, Alkali Metal, Alkaline Earth Metal, Ammonium, Amine, triethanol amine, Methyl, or $C_2$ to about $C_6$ Alkyl;

a comprises from 0 to about 0.8;

b comprises from about 0.2 to about 1.0;

c comprises from 0 to about 0.5;

d comprises from 0 to about 0.5; and wherein a, b, c, and d represent the mole fraction of each unit and the sum of a, b, c, and d is 1.0;

g) a dispersant of Formula (IV):

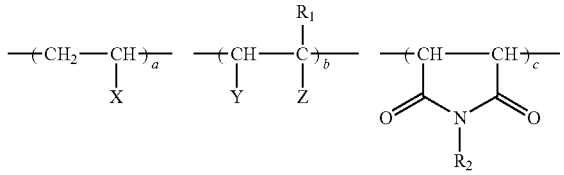

wherein in Formula (IV):

the "b" structure comprises one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X comprises at least one of H, $CH_3$, $C_2$ to $C_6$ Alkyl, Phenyl, p-Methyl Phenyl, p-Ethyl Phenyl, Carboxylated Phenyl, or Sulfonated Phenyl;

Y comprises at least one of H, —COOM, —COOH, or W;

W comprises at least one of a hydrophobic defoamer represented by the formula $R_5O$—$(CH_2CH_2O)_s$—$(CH_2C(CH_3))_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z comprises at least one of H, —COOM, —$O(CH_2)_nOR_3$ where n=2 to 6, —$COOR_3$, —$(CH_2)_nOR_3$ where n=0 to 6, or —$CONHR_3$;

$R_1$ comprises at least one of H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$ comprises at least one of H, Methyl, or C, to $C_8$ Alkyl;

$R_5$ comprises at least one of $C_1$ to $C_{18}$ alkyl or $C_6$ to $C_{18}$ alkyl aryl;

M comprises at least one of Alkali Metal, Alkaline Earth Metal, Ammonia, Amine, monoethanol amine, diethanol amine, triethanol amine, morpholine, imidazole;

a comprises from 0.01-0.8:

b comprises from 0.2-0.99;

c comprises from 0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

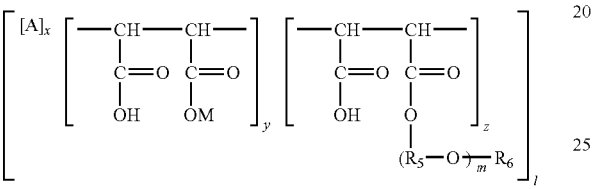

wherein A is selected from the moieties (i) or (ii)

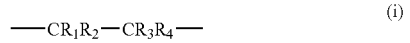

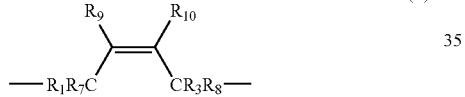

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

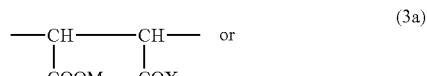

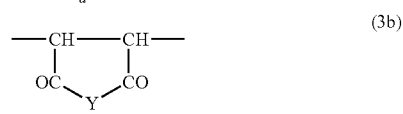

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, in is 2 to 4, and n is 0 to 100, —$NHR_2$,—$N(R^2)_2$ or mixtures thereof in which $R^2$=$R^1$ or —CO—$NH_2$: and wherein Y is an oxygen atom or —$NR^2$;

ii) 1 to 89 mol % of components of the general formula 4:

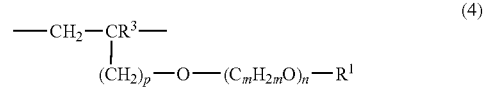

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

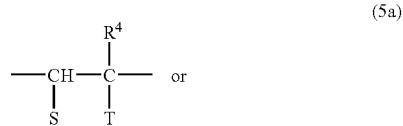

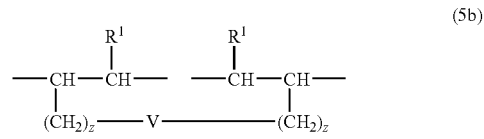

wherein S is a hydrogen atom or —$COOM_n$ or —$COOR_5$, T is —$COOR_5$, —W—$R_7$, —CO—[—NH—(CH2)3)-]$_s$—W—$R_7$, —CO—O—$(CH_2)_z$—W—$R_7$, a radical of the general formula:

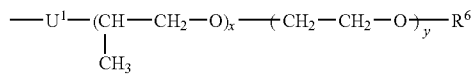

or —(CH$_2$)$_z$—V—(CH$_2$)$_z$—CH=CH—R$_1$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

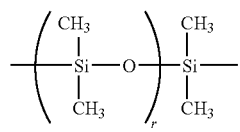

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

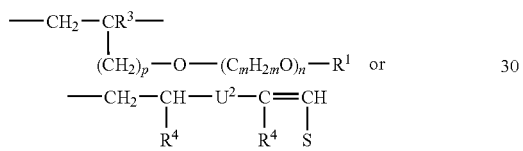

R$_7$ comprises at least one of R$_1$ or

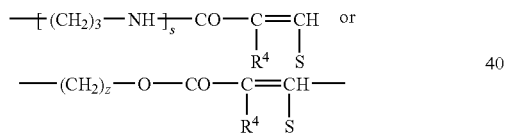

r is 2 to 100, s is 1 or 2, x is 1 to 150, y is 0 to 15 and z is 0 to 4;

iv) 0 to 90 mol % of at least one component of the formula 6a, 6b, or 6c:

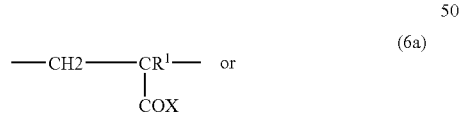

(6a)

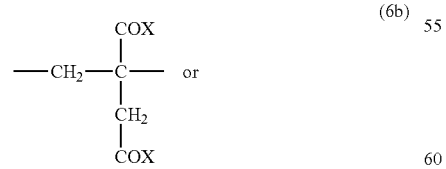

(6b)

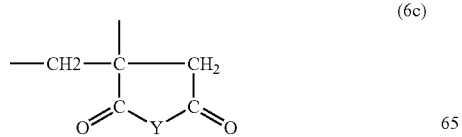

(6c)

wherein M is a hydrogen atom. a mono- or divalent metal cation, an ammonium ion or an organic amine residue, a is 1, or when M is a divalent metal cation a is ½;

wherein X is —OM$_a$;
- —O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
- NH—(C$_m$H$_{2m}$O)$_n$—R$^1$,
- —NHR$_2$, —N(R$^2$)$_2$ or mixtures thereof in which R$^2$=R$^1$ or —CO—NH$_2$; and wherein Y is an oxygen atom or —NR$^2$;

j) a copolymer of dicarboxylic acid derivatives and oxyalkylene glycol-alkenyl ethers, comprising:
i) 1 to 90 mol. % of at least one member selected from the group consisting of structural units of Formula 7a and Formula 7b:

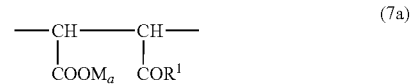 (7a)

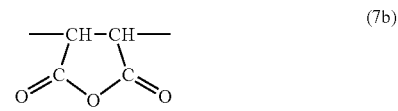 (7b)

wherein M is H, a monovalent metal cation, a divalent metal cation, an ammonium ion or an organic amine:

a is ½ when M is a divalent metal cation or 1 when M is a monovalent metal cation;

wherein R$^1$ is —OM$_a$, or
- —O—(C$_m$H$_{2m}$O)$_t$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

ii) 0.5 to 80 mol. % of the structural units of Formula 8:

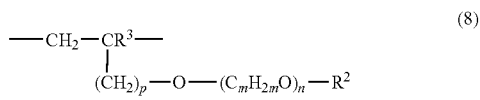 (8)

wherein R$^3$ is H or a C$_{1-5}$ aliphatic hydrocarbon;

p is 0 to 3;

R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$) M$_{a2}$;

m is 2 to 4:

n is 1 to 200;

iii) 0.5 to 80 mol. % structural units selected from the group consisting of Formula 9a and Formula 9b:

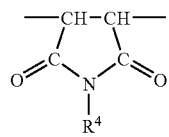

(9a)

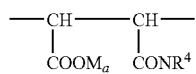

(9b)

wherein $R^4$ is H, $C_{1-20}$ aliphatic hydrocarbon that is optionally substituted with at least one hydroxyl group, $-(C_mH_{2m}O)_n-R^2$, $-CO-NH-R^2$, $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

m is 2 to 4;

n is 1 to 200;

iv) 1 to 90 mol. % of structural units of Formula 10

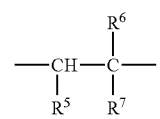

(10)

wherein $R^5$ is methyl, or methylene group, wherein $R^3$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of $-COOM_a$, $-(SO_3)_{Ma}$, and $-(PO_3)M_{a2}$, a $C_{5-8}$ cycloaliphatic hydrocarbon, $-OCOR^4$, $-OR^4$, or $-COOR^4$, wherein $R^4$ is H, a $C_{1-20}$ aliphatic hydrocarbon that is optionally substituted with at least one $-OH$, $-(C_mH_{2m}O)_n-R^2$, $-CO-NH-R^2$, $C_{5-8}$ cycloaliphatic hydrocarbon, or a $C_{6-14}$ aryl residue that is optionally substituted with a member selected from the group consisting of $-COOM_a$, $-(SO_3)M_a$, $-(PO_3)M_{a2}$.

19. The method of claim 14, wherein the naphthalene dispersant is at least one of naphthalene sulfonate formaldehyde condensate, beta naphthalene sulfonates, or sodium naphthalene sulfate formaldehyde condensate resins.

20. The method of claim 14, wherein the hydraulic cement is selected from the group consisting of portland cement, masonry cement, alumina cement, refractory cement, magnesia cement, calcium sulfate hemi-hydrate cement, calcium sulfoaluminate cement, and mixtures thereof.

* * * * *